United States Patent [19]

Johnston et al.

[11] Patent Number: 4,529,407

[45] Date of Patent: Jul. 16, 1985

[54] FUEL PELLETS

[75] Inventors: Ian F. Johnston, Corona del Mar; John Houseman, Pasadena, both of Calif.

[73] Assignee: Pickering Fuel Resources, Inc., Pasadena, Calif.

[21] Appl. No.: 566,951

[22] Filed: Dec. 27, 1983

Related U.S. Application Data

[63] Continuation of Ser. No. 277,085, Jun. 25, 1981, abandoned.

[51] Int. Cl.$^3$ ............................ C10L 5/12; C10L 5/14
[52] U.S. Cl. ........................................ 44/21; 44/10 A; 44/10 B; 44/16 C
[58] Field of Search ................. 44/10 A, 10 B, 16 C, 44/25, 26, 21

[56] References Cited

U.S. PATENT DOCUMENTS 4,167,398  9/1979  Hughes et al. ................ 44/16 A
4,236,897  12/1980  Johnston ........................ 44/10 A
4,260,395  4/1981  Anderson ...................... 44/16 C

FOREIGN PATENT DOCUMENTS

279140  10/1927  United Kingdom ............. 44/10 E

*Primary Examiner*—Carl F. Dees
*Attorney, Agent, or Firm*—Christie, Parker & Hale

[57] ABSTRACT

A fuel pellet comprises from about 97 to about 99 percent by weight naturally occurring combustible material of which at least 50 percent is natural cellulosic material and from about 1 to about 3 percent by weight synthetic polymeric thermoplastic material. Any balance of the naturally occurring combustible material is filler and is preferably selected from bark, stillage, byproducts of distillation processes, and coal. If old bark, stillage, or byproducts, such as tar and pitch, or coal are used, the amount of the material is limited to 30 percent. The free moisture content of the naturally occurring combustible material is from about 5 percent to about 15 percent by weight, with 10 to 13 being preferred and 10.5 to 11.5 percent being ideal. Substantially all the thermoplastic material is finer than 30 mesh and coarser than 80 mesh. The cellulosic material is no greater than an order of magnitude coarser than the plastic particles and its minimum size is related to bonding requirements between it and the plastic; it is finer than 10 mesh and coarser than 40 mesh. The filler is finer than 10 mesh. The synthetic thermoplastic material is distributed throughout the fuel pellet as discrete particles. A sheath of plastic is on the outside of the pellet. The thermoplastic material is solid at room temperature and has an injection molding temperature of about 95° C. or more. The fuel pellet is made in an extruder where the temperature of the pellet is controlled to assure softening of the plastic within the forming pellet without agglomeration.

27 Claims, 1 Drawing Figure

FUEL PELLETS

This is a continuation of application Ser. No. 277,085 filed June 25, 1981 and now abandoned.

BACKGROUND OF THE INVENTION

The present invention relates to cellulosic fuels in the form of pellets bound with a plastic binder.

Due to diminishing quantities of coal, petroleum, and natural gas products, attention is being directed to other energy sources. One source which is receiving considerable attention is biomass materials such as wood, bagasse, their byproducts, and agricultural residues.

Use of compressed wood waste, pellitized or briquetted, for example, as a fuel source has achieved only limited acceptance to data. One reason for this is the relatively low realized heating value of compressed waste. Compressed wood wastes also have a slow burning rate. Some of these wastes have exhibited incomplete burnout, resulting in the formation of carbonaceous residues and low combustion efficiency. In addition, compressed wood can be hard to ignite. Another problem is in the fraility of compressed wood which leads to special handling to avoid crumbling, the creation of fines and dust, and the avoidance of weathering.

To overcome the crumbling and weathering problems, inorganic binders, such as cement and silicate of soda, and organic binders, such as tar, pitch, rosin, glues, waxes and fibers, have been included in the pellets. However, no binder has been found which completely solves the above problems, and which also is inexpensive and does not reduce the heating value of the wood.

Attempts have been made to use the self-binding characteristics produced from lignin in various species of wood to avoid the crumbling problem. This can be done with some species of wood, but not all species, by heating the wood above the minimum plastic temperature for lignin of 163° C. However, such a wood pellet still does not have a high mechanical strength. Furthermore, such high temperatures can severely limit the operating life of the pelletizing equipment, drive high BTU volatile components from the wood, and lose some energy because of the requirement of heating.

Specific examples of prior art approaches include the disclosures of British patent specifications No. 901,789 to Stamicarbon, Japanese patent application No. 46-10282 of Masoyoshi, U.S. Pat. No. 3,947,255 to Hartman et al, U.S. Pat. No. 3,843,336 to Messman, and U.S. Pat. No. 4,015,951 to Gunnerman. Stamicarbon discloses a fuel briquette of coal particles and a binder of an olefinically unsaturated hydrocarbon. The fuel particles are smaller than 3 mm. The bonding of the binder to the coal particles is by melting the binder to distribute it throughout the coal, dissolving the binder to effect absorption on the coal, or effecting a skin of binder on the coal particles with a tar oil distillate and hot compression. Stamicarbon uses only a modest amount of plastic, one to two percent, and discloses a moisture content of from five to eight percent. The Masayoshi patent application discloses a fuel of 9 to 66 percent thermoplastic in a balance of wood meal or chips. Masayoski melts the thermoplastic to combine it with the wood meal or chips. Hartman uses from 2.5 to 40 percent plastic as a binder for bark. The plastic is melted to do its job. The moisture content of Hartman's bark is less than 7%. Messman discloses an artificial fireplace log of thermosetting resin, sawdust, wax and fuel oil. Messman effects a sheath of plastic on the outside of an extrudate, the log, and uses a high percentage of plastic. Gunnerman uses fibrous material, he examples wood, with a moisture content of from 16 to 28%. He compresses the material with a die such that the temperature of the pellet as it leaves the die is from 325° to 350° F. (163° to 177° C.), and then dries the pellets. He states that pellets made by his process are held together by interlocking of broomed out, fibrous particles, and possibly heat softened lignin. The size of the individual particles is not more than 85% of the minimum dimension of the pellets.

In U.S. application Ser. No. 943,393 of Ian Fraser Johnston, a pellet of cellulosic material and thermoplastic is disclosed. The Johnston pellet has from 1 to 10% thermoplastic in a balance of cellulosic material. That material contains from 5 to 15% moisture. Both the plastic and cellulosic material are particles small enough to pass through a 5 mesh screen. Johnston discloses a unique bonding between the cellulosic constituent and the plastic. Instead of melting or dissolving the plastic, he softens it so that upon extrusion it interstitially penetrates the fibers of the cellulosic material to produce a mechanical lock between pieces of the material. Johnston's pellets also burn better than the individual components alone. It is thought that the small plastic particles act as ignition sites which liberate combustible gases that progress from the sites into the cellulosic material. There, the combustible gases burn and enhance the ignition and burning of the cellulosic material. The cellulosic material separates the individual plastic particles and permits their burning independently of one another, avoiding the charring attendant with the burning of larger plastic particles. In connection with the enhanced combustion noted in the Johnston pellet, it is known from the work of others that in normal combustion a lignin constituent of cellulosic materials like wood has a high heat of combustion relative to cellulose, but that lignin tends to pyrolyze to char and not burn completely. The char tends to burn slowly in solid phase combustion by smoldering with low rate of heat release. The products of combustion of the lignin in this combustion domain are high in combustible content. If the heat flux increases, the lignin can burn in flaming combustion, leaving little ash. (See Shafizadeh and Bradbury, Smoldering Combustion of Cellulosic Materials, Journal of Thermal Insulation, Vol. 2 (January, 1979).) The combustion products of the Johnston fuel are very low in carbonaceous ash content relative to a natural lignin containing cellulosic material burned under the same conditions. This has lead to the hypothesis that the particulate plastic creates a combustion environment that completes the combustion of any lignin constituent of the cellulosic material, liberating the considerable heat of combustion of lignin, and leaving very little carbonaceous ash.

SUMMARY OF THE INVENTION

This invention provides an improved fuel pellet of naturally occuring combustible material, including at least 50% cellulosic material, and thermoplastic resin, and a process of its manufacture. The pellet has excellent combustion characteristics even though only a small amount of plastic is used. It has been found that by making the particulate particle size of the plastic and cellulosic material small, less plastic can be used to get the same combustion characteristics of a pellet with more plastic, and these characteristics are excellent, giving high heat release and low carbonaceous ash residue. It has also been found that by observing a relationship between plastic and cellulosic particle size, a good mechanical bond results between the plastic and fibers of the cellulosic material.

In one form the present invention provides a compressed fuel pellet that has from about 97 to about 99% weight particulate naturally occurring combustible material, and from about 1 to about 3% by weight particulate, synthetic, polymeric thermoplastic material. The naturally occurring combustible material contains from 50 to around 100% natural cellulosic material. Compression is preferably by a die, the fuel pellet becoming an extrudate. The plastic bridges between cellulosic particles and anchors to these particles by an intimate association with their fibers. It is possible to include some filler material other than natural cellulosic materials, for example, bark, coal, stillage, or tar-like residues from such processes as alcohol distillation. (Bark and stillage may be considered non-cellulosic here because they do not possess the fibrous texture necessary for the satisfactory bond produced by natural cellulosic materials.) If the material is somewhat fibrous, like young bark, a maximum of up to about 50% particulate non-cellulosic material can be used with the 1 to 3% plastic, the balance being the particulate, natural cellulosic material. Old bark is not fibrous, less can be used, say a maximum of 30% with 1 to 3% plastic, the balance being the natural cellulosic material.

Preferably, the pellet is substantially 97 to 99% by weight particulate, natural, cellulosic material and from about 1 to about 3% by weight particulate, synthetic, polymeric thermoplastic material. The use of substantially all cellulosic material as the naturally occurring combustible material results in a very strong pellet.

The plastic in the pellet is homogenous throughout, except in a preferred form where the alteral walls of the pellet is a continuous plastic sheath. The plastic in the pellet is also in particulate form. Importantly, the size of the plastic particles is such that substantially all of the plastic passes through a 30 U.S. standard mesh screen ($-30$) and is retained on an 80 U.S. standard mesh screen ($+80$). The particle size of the cellulosic material bears a definite relationship to that of the plastic so that the plastic does not get too small relative to the cellulosic material. The cellulosic material is sized so that substantially all the material passes through a U.S. standard 10 mesh screen ($-10$) and is retained on a U.S. standard 40 mesh screen ($+40$). This means that the cellulosic material has a characteristic dimension (diameter) no greater than an order of magnitude larger than a characteristic dimension (diameter) of the plastic.

Any non-cellulosic filler should have a maximum particle size no greater than that of the cellulosic material. The non-cellulosic material may be finer than the cellulosic. The small particle size of the plastic produces excellent combustion of both the plastic and the naturally occurring combustible material. Combustion in the naturally occurring combustible material is enhanced by the liberation of combustible gases from the plastic. The same mechanism enhances complete combustion of any lignin present. Combustion of the plastic is also complete because the relatively high surface area of the plastic particles is maintained and the various plastic particles cannot agglomerate as they are tightly held within the cellulosic fibers.

The plastic particle size can be too small, and the relation of that size to the cellulosic particle size must be observed for a good bond. If the plastic is smaller than 80 mesh it no longer bridges satisfactorily between cellulosic particles. When the plastic particle size exceeds 30 mesh, good combustion and bonding are possible, but at the cost of at least a greater amount of plastic. The order of magnitude difference in particle size must be observed as the limit of size difference because if the plastic becomes too small it will not be able to bridge the distance between individual cellulosic particles. The greater the particle size, the more plastic is required to produce a pellet having good strength. Also, if the plastic particle size is too large, it will not soften during extrusion to form a thin piece that extends between pieces of cellulosic material. When the pellet is to be pulverized for air suspension burning, excessively sized plastic results in detached particles of plastic in the pulverized mixture, with a loss of the advantages that intimacy between the plastic and cellulosic material affords. The cellulosic material can be too fine. If this material becomes smaller than 40 mesh it loses its fibrous quality and the interstitial bonding quality of the plastic and cellulosic material suffers. The free moisture content of the cellulosic material is from about 5 to about 15%, with 10 to 13 being preferred as measured prior to pelletizing. Ideally the moisture content is even narrower, 10.5 to 11.5%. The moisture content after pelletizing and any drying is less, preferably about 8%. The thermoplastic material is chosen so it is solid at room temperature and has an injection molding temperature of about 95° C. or greater. Fuel pellets of the present invention exhibit complete burnout, burn faster than pellets not containing thermoplastic material, and have good structural integrity.

The range of plastic required, 1 to 3%, is dictated by both bonding and combustion requirements. If there is insufficient plastic, less than 1%, the advantageous individual ignition sites are lost and the strength of the pellet drops. A 3% plastic content may be required to bind some hard woods or where there is a high percentage of the noncellulosic component. In general, however, the less plastic the better because of cost. A preferred composition range is from 1 to 2% plastic.

The principles of the present invention permit the use of filler combustibles, such as bark, stillage, other products of distillation, and coal, with the cellulosic particulates and plastics. Old bark generally is not fibrous, and therefore, with it as well as with stillage and coal, the locking mechanism of this invention does not apply. It can be bound, nonetheless, if there is enough cellulosic material to provide the anchor sites for the plastic. For coal, stillage, and old bark, up to about 30% of the material with 67 to 69% cellulosic material and 1 to 3% plastic produces a satisfactory product. For newer bark, bark that is fibrous, up to 50% bark can be used. The resulting formulation has up to 50% bark, 1 to 3% plastic, and the balance cellulosic material. The moisture content of the product and the plastic particle size remain unchanged.

In another aspect, the present invention includes in the pellet an alkali metal silicate selected from sodium silicate and potassium silicate. One to two percent of the silicate by weight is preferred, but up to about 10% could be acceptable. It is believed that the alkali metal acts as a catalyst in promoting gaseous combustion. It is also believed that the silica crystals are thermal radiators and promote ignition by thermal radiation. The ability to produce intense infrared radiation, when heated, is an inherent property of silica crystals. The alkali metal silicate also promotes bonding, and the mechanical strength of the pellet, a more densified pellet, and an enhanced hydrophobic sheath on the pellet.

The fuel pellet can be made by preparing a feed of particulate natural cellulosic material, any of the filler, noncellulosic material, and particulate synthetic thermoplastic material. Substantially all of the thermoplastic material is −30 U.S. standard mesh and +80 U.S. standard mesh. The cellulosic material is substantially all −10 U.S. standard mesh and +40 U.S. standard mesh. The filler is substantially all −10 U.S. standard mesh. The plastic and cellulosic materials are intimately combined by compressing the feed in an extrusion die. Extrusion takes place under temperature and rate conditions where the plastic in the interior of the pellet does not melt, but only softens. The plastic thus retains its particulate nature. Extrusion flattens the particulate plastic into thin pieces and forces these pieces into an intimate mechanical bond with the fibers of the cellulosic material.

DETAILED DESCRIPTION OF THE PREFERRED EMBODIMENT

The present invention provides both a fuel pellet and a process for its manufacture. The pellet is characterized in its use of a small amount of a plastic binder and its exceptional mechanical strength and combustion characteristics. The pellet burns completely in either grate burning or in air suspension burning, the latter after pellet comminution.

In preferred form, the pellet is from about 97 to about 99% cellulosic material and from about 1 to about 3% thermoplastic. Preferably, the pellet is from about 98 to 99% cellulosic material and from about 1 to 2% thermoplastic. The thermoplastic is present in particulate form and acts as a binder between cellulosic particles. More specifically, the pellet is formed in an extrusion process that maintains that integrity of individual plastic particles. That is, they do not fuse together to form one cohesive and continuous piece of material. The extrusion process deforms the plastic into thin pancake-like pieces or platelets (not necessarily planar) and forces these pieces into intimate mechanical locks with the fibers of cellulosic host material. The plastic can be viewed as tendons holding the cellulosic fibers together. It is important that the plastic maintain its particulate quality. The particulate quality assures good burning of not only the plastic, but also the cellulosic material.

The pellet can include naturally occurring filler materials of say, coal, stillage, other products of distillation processes, bark, and tar-like substances. Bark has a high heat of combustion and is a plentiful product of the forest industry. Depending on the bark, it is more or less fibrous. New bark can be relatively fibrous. Old bark can be essentially free of fibers. Because of mechanical strength requirements, up to 50% of the pellet can be new bark. When old bark is used, up to 30% of the pellet may be bark. In either case, the plastic content remains 1 to 3%, and the balance of the pellet is natural cellulosic. Coal is not cellulosic at all, and it must be bound between cellulosic particles. Stillage is a modified substance including some cellulose. The fibrous quality of cellulose that gives the good bending characteristics, however, is largely lost in processing, and, therefore, the material is a filler. Distillation byproducts other than stillage, such as molasses and pitch, may also be used with efficacy as a filler. These byproducts have been a difficult problem in disposal.

The particulate quality of the plastic insures a large surface area for the plastic which leads to high combustion rates of the plastic. The hot combustion gases from the burning plastic particle ignite any filler and the cellulosic material around the particle and promote the total combustion of these. Cellulosic material derived from wood contains a considerable amount of lignin. Lignin does not burn as readily as cellulose. Quite often the lignin burns in solid state with a smoldering flame, leaving a substantially unburned residue in the form of char. This char has considerable fuel value. It also would constitute a source at least of particulate pollution. The particulate plastic creates a combustion domain that assures complete burning of any lignin in the host cellulosic material. This is so whether the fuel is burned as a pellet or whether it is comminuted or pulverized and burned in air suspension. In the case of the latter, the plastic remains in intimate contact with cellulosic particles when the size limitations to be described on the plastic are observed.

A minimum amount of plastic may be used when the plastic is sufficiently fine to pass a 30 U.S. standard mesh screen, but coarse enough not to pass an 80 U.S. standard mesh screen. This size of particulate plastic is large enough to span between cellulosic particles for the bonding function. The size is desirably small to take advantage of a large surface-to-volume ratio that produces easy ignition and rapid combustion that enhances lignin and cellulose combustion. This small particle size also assures complete combustion of the plastic. As is well known, when plastic gets too massive, and the surface-to-volume ratio gets too low, the plastic tends to burn incompletely, leaving char. The plastic particle size is also sufficiently small so that it will soften to form thin platelets or pancakes in the pellet during extrusion. It has been found that when the plastic particle size is too large, the particles will not soften and form the thin platelets that bind the cellulosic particles together.

The particle size of the cellulosic material and any filler, say bark, bears a definite relationship to that of the plastic. The particle size should be sufficient to pass a 10 U.S. standard mesh screen. The cellulosic material should be sufficiently coarse to stay on top of a 40 U.S. standard mesh screen. With this range of size, the characteristic dimension of the cellulosic materials is about an order of magnitude greater than a corresponding characteristic dimension of the plastic material. If the cellulosic particle size gets too large with respect to the particle size of the plastic, the plastic cannot span the distance between individual cellulosic particles because it gets lost in the fibers of the cellulosic material. Furthermore, excessively large cellulosic particles do not burn as well as smaller ones. If the plastic gets large with respect to the cellulosic material, there is a waste of plastic, and one can encounter the combustion and the softening problems previously described. (Assuming that the softening problem can be overcome, and ignoring the plastic combustion problems that might occur, plastic particles larger than the limits set out there will effect a good bridge between cellulosic particles.) If the cellulosic material is too fine, it loses its fibrous character. The result is a loss in mechanical strength because of a loss of the bonding mechanism between the plastic and the cellulosic material that relies upon the fibrous nature of the cellulosic material in the interlocking mechanical bond.

Any filler must be held largely by the bond between the plastic and the cellulosic material. If the filler particles are too large, they interfere with the bonding mechanism between the plastic and the cellulosic material. Excessive large filler particles do not burn as readily either. The lower limit of filler size is dictated by economics. There is no reason to make the filler particles very small, but if they are already, their fineness will not harm the result. Coal dust is an example of fine filler that exists without need for further size reduction.

The amount of plastic should be between about 1 to about 3% of the total fuel pellet. This amount of plastic in conjunction with the size and particulate limitations of the plastic and the size limitations of the cellulosic material produces the good combustion and bonding characteristics with a minimum amount of plastic. The inclusion of the 1 to 3% thermoplastic of a pellet as a binder can be viewed in a different light. Without the thermoplastic, to satisfactorily pelletize only the cellulosic material would require considerably higher temperatures. It also assures that the plastic acts as lubricant in the pellet dies or rollers. It can effect a sheath on the outer surface of the pellet, which is helpful to make the pellet hydrophobic.

The preferred range of plastic is between about 1 to about 2% of the total fuel pellet. Usually this range satisfies the requirements of pellet strength and enhanced ignition. However, particularly with hard woods, and large amounts of filler, more plastic may be required as a binder.

The moisture content of the cellulosic material should be between about 5 to about 15%. If there is inadequate or too much moisture the pellet tends to lose strength and can disintegrate in the rough and tumble of handling and transport. Too much moisture adversely affects the combustion qualities by lowering the flame temperature. It is preferred that the moisture content be held within 10 to 13%. A moisture content of the cellulose of from 10.5 to 11.5% is ideal. This range is the optimum range for pellet strength. Moisture content is measured in the cellulosic material prior to pelletizing. The pelletizing may reduce the moisture to some extent, 4 to 8% by evaporation into air.

When the pellet is to be used for air suspension burning, it may be desirable to reduce the moisture content to lower than the prescribed range after the pellet has been comminuted in order to enhance combustion characteristics. Obviously, after the pellet has been comminuted into the small particles suitable for air suspension the moisture previously required for structural integrity of the pellet is no longer necessary. The process of comminuting itself reduces the moisture content.

The thermoplastic materials have an injection molding temperature of close to about 95° C. or higher. It can be a little lower than this. This limitation is necessary to avoid excessive plastic melting during the extrusion process. If the plastic melts excessively, its particulate nature is lost and the qualities associated with that characteristic are also lost. Some melting is permissible so long as the plastic particles do not agglomerate.

The cellulosic material may be derived from any number of biomass sources. The most common sources will be wood waste, such as sawdust, wood shavings, and bagasse. Certain agricultural wastes also classify as cellulosic, as well as paper and cardboard. Wood and bagasse materials are preferred because they have a high heat of combustion and lower moisture content than agricultural wastes. They are also preferred because of their abundance.

The thermoplastic material can be practically any available synthetic thermoplastic, such as polystyrene, polyethylene, polypropylene, acrylonitrile-butadienes-tyrene, acetyl copolymers, acetyl homopolymers, acrylics, polybutylene, and combinations of these. Polyvinylchloride, however, should not be used because it contains a halogen that presents corrosion and emission difficulties upon combustion. If there is a preference of thermoplastic materials it would be for polypropylene and polyethylene because these materials burn rapidly and ignite readily.

The minimum injection molding temperatures of common thermoplastics are reported in Modern Plastics Encyclopedia, Vol. 49, McGraw-Hill, 1972-3 Edition, and are presented in Table 1.

TABLE 1

| Synthetic Thermoplastic | Minimum Injection Molding Temperature (°F.) |
| --- | --- |
| Polystyrene | 163° C. (325° F.) |
| Polyethylene | 122° C. (250° F.) |
| Polypropylene | 191° C. (375° F.) |
| ABS | 183° C. (360° F.) |
| Cellulosics | 168° C. (335° F.) |
| Nylon | 191° C. (360° F.) |
| Polyesters | 132° C. (270° F.) |

High impact polystyrene presents difficulties in pelletizing because it is so hard; it is difficult to pelletize a feed having more than 1.25% by weight of such material.

It has been found that during the pelletizing process some of the thermoplastic material at the surface of the pellets will be sufficiently heated by the friction between the pellet and the extrusion dies to melt and form a thin sheet or coating on the lateral outside surfaces of the pellets. This coating is hydrophobic and serves to prevent the absorption of moisture by the pellets during storage.

It is contemplated that materials other than the cellulosic and thermoplastic materials can be included in the pellet for a particular application or processing conditions. For example, oxidizing agents such as sodium perchlorate and ammonium nitrate might be added to facilitate combustion. Binding agents such as paraffin, slack wax, carnuba wax, and certain lignosulfanates, such as ammonium lignosulfanate, sodium lignosulfanate, calcium lignosulfanate, and magnesium lignosulfanate can be added. Oil seeds and their products have a fatty acid content that can reduce wear in the pelletizing die. Examples of such materials include coconut husks, soy beans, peanuts, sunflower seeds, corn cake, pressing residuals, and ethanol plant stillage.

To aid in the drying of cellulosic feed material dry slake lime, that is, calcium carbonate, can be combined with the feed. Other dessicants can be used. The calcium carbonate combines with water and feed material and allows the rapid release of moisture from the feed in a dehydrator. The calcium carbonate can be added in amounts from about 2 to about 10% by weight of the dry feed, with about 5% by weight significantly aiding in the drying process. The calcium carbonate is preferably removed as by dry classification, before pelletizing.

In applications were there is an excessive amount of free water in the cellulosic feed material it is most economical to remove the water by mechanical processes, such as powered presses and tapered screw presses.

While it is presently preferred to pelletize the pellets with an extruder, briquetting can also be attractive.

The bond in the pellet of this invention is a very good one. It it needs to be enhanced, as could be required with a high percentage of non-cellulosic material present, say old bark, sodium or potassium silicate can be used. When such a silicate is used, it hydrolizes acidic lignatious and cellulosic materials. This results in a more compressible cellulosic component and a denser pellet. On dehydration, the silicate sets and acts as a cement; augmenting the thermoplastic and knitting the fibers together. The thermoplastic sheath is compounded on a more hydrophobic base and the pellet has enhanced weathering resistance. The silicate increases the ash content; but will not materially affect performance in either air-suspension or grate burning. The alkali silicate can be introduced in a blender upstream from an extruder or briquette. When just weather resistance is desired, it is also possible to add it, while the thermoplastic sheath is still hot and the alkali silicate adhesion will take place. The amount of silicate may be on the order of 1% by weight. The silicate has a high viscosity, which can be lowered by heating.

The alkali metal silicate, such as water glass, is also thought to be a combustion enhancer or combustion catalyst. It has been observed that pellets with about 4% by weight sodium silicate burn with greater intensity (at a faster rate) than otherwise identical pellets without the silicate. It is thought that the alkali metal acts as a catalyst for combustion.

Solutions of sodium silicate are strongly alkaline and are readily decomposed by acids with separation of silicic acid. Upon heating, the latter is converted to silica. It is thought that the same processes take place in the mixture of sodium silicate and wood wastes, as the latter contain acidic substances. The resulting crystals of silica are believed to promote ignition by intense radiation of infrared heat. The ability to produce intense infrared radiation, when heated, is an inherent property of silica crystals. The preferred amount of the silicate is from 1 to 2% by weight. The combustion enhancement would be present with this amount of the silicate without excessive ash. The densification, weatherproofing, and bonding qualities would also be good at these concentrations.

A pellet with the alkali metal silicate will have the following composition: from about 1 to about 3% by weight particulate, synthetic polymeric thermoplastic material, from about 1 to about 10% by weight of the alkali silicate, and from about 87 to about 98% naturally combustible material. The naturally combustible material includes at least 50% natural cellulosic material with the balance being filler.

With wood wastes that have a high lignin content, it is possible to make a fuel pellet with enhanced combustion properties consisting of 1 to about 10% by weight of the alkali silicate and from about 90 to 99% naturally combustible material.

Figure 1:
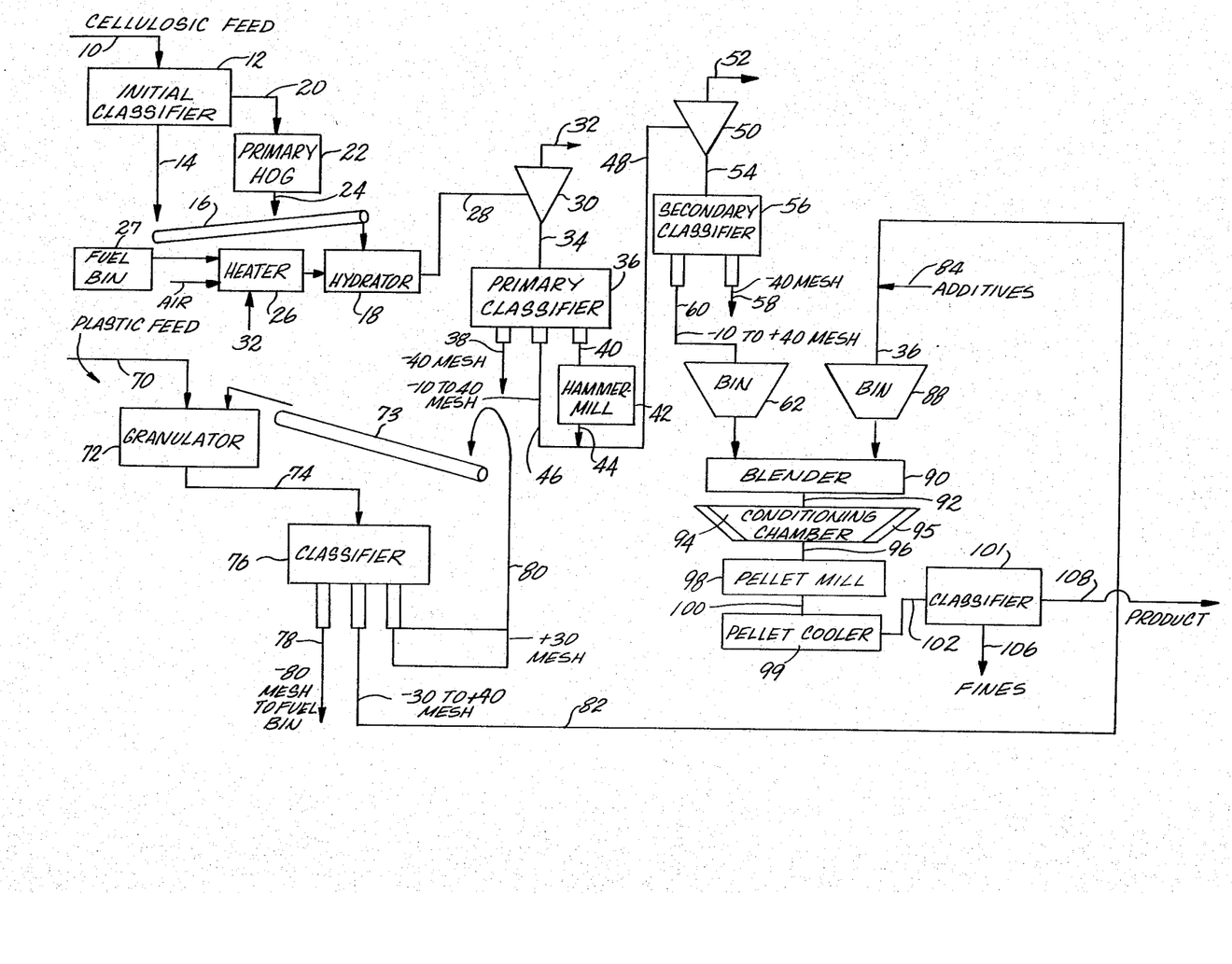
The single FIGURE is a flow schematic of a suitable facility to fabricate pellets in accordance with the preferred embodiment of the present invention.

The single FIGURE shows schematically a suitable plant for fabrication of pellets of the present invention. Before getting into the description, it should be appreciated that there are several approaches to the manufacture of pellets. In addition, the flow sheet of the FIGURE avoids inclusion of detail which would be obvious to the artisan, such as certain storage hoppers, conveyors, and the like. The plant can also take advantage of waste material in the form of cellulosic and thermoplastic fines derived from the process, inherent in the feed material, and resulting from pellet fines, the fuel energy consuming heaters, such as used in a dryer to dehydrate wet cellulosic feed materials.

Referring to the FIGURE, cellulosic feed material from any desired source is fed as a stream 10 into an initial classifier 12. An output stream 14 of the classifier contains cellulosic feed material of $-\frac{1}{2}$ inch or $-\frac{3}{8}$ inch mesh. That stream goes onto a conveyor 16 and feeds into a dehydrator 18. A second stream 20 from the classifier feeds a primary hog 22 with $+\frac{1}{2}$ inch feed that comminutes the material and discharges it as a stream 24 onto conveyor 16. The primary hog functions to reduce the feed of stream 20 to $-\frac{1}{2}$ inch to $-\frac{3}{8}$ inch mesh. Stream 24 combines with stream 14 on conveyor 16 and feeds into dehydrator 18.

A heater 26 supplies the heat energy for the dehydrator. In the dehydrator, the cellulosic feed material has its 40 to 60% moisture content dropped to from about 5 to about 15%, preferably from about 8 to about 11%. Heater 26 is fueled from a fuel bin 27.

The discharge stream from dehydrator 18 is indicated at 28. It feed a cyclone 30 where gas and solids separate. The gas exits cyclone 30 as a stream 32, and the solids exit as a stream 34. A fraction of the gas can be recycled to heater 26.

Stream 34 enters primary classifier 36. Those materials that are finer than 40 mesh leave the primary classifier as a fine stream 38. This stream is used as a source of energy to fuel heater 26. Coarse cellulosic material leaves primary classifier 36 as a stream 40 and is comminuted in a hammermill 42 to $-10$ to $+40$ U.S. standard mesh. The exit stream from hammermill 42 is indicated as stream 44.

The primary stream exiting the primary classifier 36 is a stream 46 constituted of cellulosic material of $-10$ to $+40$ U.S. standard mesh. This stream combines with stream 44 to form a stream 48 which is transported by air blowing to a high elevation level where it feeds a secondary cyclone 50 where again gas and solids are separated, with the gas leaving the top as a stream 52 and the solids leaving the bottom as stream 54. Stream 52 may be recycled into fuel bin 27.

The solids enter a secondary classifier 56. In secondary classifier 56 excessively fine material is classified and discharged as a stream 58. These fines are used as fuel in the plant, say in a boiler that provides steam. Stream 58 also includes silicates and carbonates, whose removal improves pelletizer die life. Properly sized material of from $-10$ to $+40$ mesh leaves secondary classifier 56 as a stream 60 and enters a holding bin 62 preliminarily to blending with granulated thermoplastic.

Thermoplastic preparation is done separate from the cellulosic material. It can obviously effect removal of unwanted materials such as metals, glass, and polyvinylchloride by any of a number of techniques, including magnets, weight sensitive separators, and flotation.

The thermoplastic enters a granulator 72 as a plastic feed streem 70 where it is ground. The granulated plastic passes as a stream 74 into a classifier 76. Excessively fine plastic leaves the classifier as a stream 78. This stream contains a plastic that passes through an 80 U.S. standard mesh screen. Excessively coarse material leaves classifier 76 in a stream 80 and is recycled back to granulator 72 on a conveyor 73. This coarse material is coarser than U.S. standard mesh. The properly sized plastic of from −30 to +80 mesh leaves the classifier 76 as a stream 82 and combines with any additives from a stream 84 as a stream 86 that goes to a bin 88.

Bin 88 feeds a blender 90 as does bin 62. Metering is effected by any number of well known techniques to effect the required 1 to 3% weight percent plastic feed with a balance of cellulosic material. Any sodium or potassium silicate can also be added in blender 90.

The discharge from blender 90 is a stream 92 that flows into a conditioning chamber 94. A steam jacket 95 heats the cellulosic-plastic feed. The steam comes from a boiler fueled by cellulosic fines. The conditioning chamber has an exit stream 96 that supplies a pellet mill 98. Again the feed can be metered in any number of known techniques. A high-speed mixer-conveyor moves the material through the conditioning chamber to a pellet mill chute.

The pellet mill must be capable of producing a pressure in an extrusion die that causes temperatures of the feed material to increase so that the pellets have a temperature sufficient to soften the plastic particulate material within the pellets to form the thin pancake-like platelets. The pressure exerted by the die should be adequate to force the plastic into the intimate relationship with the fibers of the cellulosic material that is the characteristic of the mechanical lock of the plastic on the cellulose. It has been found that when temperature of the exiting pellets is from about 66° C. to about 122° C., the plastic is adequately malleable to deform under pressure. Any temperature above this risks the possibility of excessively melting the plastic in the pellets and can result in unacceptable agglomeration of the particulate plastic into particles that are too large. The preferred lower temperature is about 88° C. The surface of the extrudate may be sufficiently heated, and preferably so, to produce localized melting of thermoplastic material on the surface. This material, when it hardens, forms a thin, continuous sheath on the resulting pellet. As already commented upon, this sheath affords a hydrophobic quality to the pellet. In addition, it lubricates the dies to increase their life and increase production capacity. The thermoplastic within the pellet, with the exception of this sheath, is substantially homogeneously distributed. From the pellet mill, the pellets enter a cooler 99 as a stream 100.

From pellet cooler 99, the pellets enter a classifier 101 by a stream 102. Fines and reject pellets are discharged from the classifier as a stream 106. The reject pellets are pulverized and combined with waste fines from the other classifiers to form a mixture that is used as fuel for the dryer burner and boiler. A product stream 108 leaves for storage.

EXAMPLE I

Tests were conducted on comminuted fuel pellets having 2% by weight thermoplastic and 98% by weight cellulosic material. The thermoplastic included polyethylene, polystyrene and polypropylene. Tests were also run on comminuted fuel pellets and coal, and just coal. The thermoplastic was between substantially minus 30 mesh and plus 80 mesh. The cellulosic material was between substantially minus 10 mesh and substantially plus 40 mesh. The pellets were made by an extrusion process. Particulate thermoplastic material was homogeniously present throughout the pellets. There was a thermoplastic sheath on each pellet. The pellets were comminuted in a hammermill and screen sieved with a 1/16 inch screen for the "K" pellet and a 1/32 inch screen for the "N" pellet. The comminuted pellets were transferred pneumatically through a cyclone separator and ultimately transferred to a silo next to a test furnace. Coal and a 50% coal-50% pellet mixture were also tested.

The test furnace was a Coen Company horizontal cylindrical suspension air heater. It had air cooled, refracting lined walls, internal fan and windbox, and a rated heat input capacity of 4 million Btu/hr. The furnace had a pneumatically fed, pulverized fuel, air suspension burner with a five port diffuser.

Fuel was fed from the silo with a vibrating screw feeder and an air blower that pneumatically conveyed the fuel from the feeder to the burner.

All tests were conducted with the furnace fully preheated to steady state temperature. The best air and fuel feed rates were determined by visual observation of the flame pattern.

TABLE I

| FUEL TYPE Proximate Analysis | Pellet "K" | Pellet "N" | 50% Coal/ 50% "N" | Straight Coal |
|---|---|---|---|---|
| Moisture Content (%) | 4.81 | 4.21 | 3.85 | 4.30 |
| Sulfur Content (%) | 0.01 | 0.01 | 1.51 | 2.08 |
| Ash Content (%) | 0.57 | 0.61 | 7.02 | 9.07 |
| Volatile Matter (%) | 82.78 | 84.62 | 48.73 | 38.66 |
| Fixed Carbon | 11.48 | 10.56 | 40.40 | 47.97 |
| Heating Value (Btu/lb) | 8,178 | 8,148 | 11,198 | 12,239 |
| Firing Rate ($10^6$ Btu/hr) | 3.48 | 2.42 | 3.58 | 3.20 |
| Excess Air (%) | 85 | 93 | 95 | 62 |
| Flue Gas Moisture Content | 10.0 | 10.3 | 5.6 | 8.4 |
| Average Flue Gas Temperature (°F.) | 1887 | 1743 | 1732 | 1892 |
| Average Furnace Temperature (°F.) | 2105 | 1995 | 1866 | 2041 |
| Average Flame Temperature (°F.) | 2450 | 2350 | 2350 | 2450 |
| Particulate Emission | | | | |
| (GR/SCF) | 0.16 | 0.12 | 0.97 | 1.47 |
| (lbs/hr) | 1.6 | 1.0 | 9.7 | 11.9 |
| (lbs/$10^6$ Btu) | 0.47 | 0.44 | 2.7 | 3.7 |
| Unburned Carbon In Flue Gas (% by wt) | 0.15 | 0.04 | 0.19 | 0.22 |
| $SO_2$ Emissions (lb/$10^6$ Btu) | <0.03 | <0.03 | 1.77 | 3.46 |
| (ppm) | <15 | <15 | 540 | 1160 |
| $H_2SO_4$ Emmissions (lb/$10^6$ Btu) | <0.001 | <0.001 | 0.0027 | 0.0042 |

TABLE I-continued

| FUEL TYPE<br>Proximate Analysis | Pellet "K" | Pellet "N" | 50% Coal/<br>50% "N" | Straight<br>Coal |
|---|---|---|---|---|
| (ppm) | 2 | 1 | 5 | 9 |
| $NO_x$ Emissions<br>(lb/$10^6$Btu) | 0.15-0.25 | 0.35-0.39 | 0.24 | 0.81 |
| Average Total<br>Hydrocarbon (ppm) | <5 | <5 | <5 | <5 |
| Flue Gas Oxygen<br>(% by volume) | 9.8 | 10.5 | 10.6 | 8.3 |
| Flue Gas Carbon Dioxide<br>(% by volume) | 10.3 | 8.4 | 10.1 | 11.2 |
| Flue Gas Carbon<br>Monoxide (% by volume) | 0.002 | 0.003 | 0.005 | 0.005 |

The pulverized fuel pellets exhibited complete burnout and very low emissions with a smoke-free stack in a coal-type suspension burner. All emissions met current standards. The feul pellets needed to be pulverized in a hammer mill to only minus 32 mesh. There is no need to grind the pellets as fine as coal (normally 70% through 200 mesh), so that an economical hammer mill can be used instead of a more expensive and more power-intensive coal grinder. The complete burnout of both the cellulosic content, as well as the thermoplastic additive of the pellet, was demonstrated by the low values of unburned carbon in the flyash, the low values for carbon monoxide and total hydrocarbons in the stack gas, and the total absence of any visible smoke in the stack gas. The extremely low value of sulfur in the pulverized fuel (0.01% sulfur) is reflected in the low values of sulfur dioxide ($SO_2$) and sulfuric acid ($H_2SO_4$) in the stack gas emissions (less than 0.030 lb/$lp^6$ BTU and less than 0.001 lb/$10^6$ BTU, respectively. The low ash content (0.6%) of the pulverized pellet is reflected in the low particulate emissions of 0.12 to 0.16 Grains/SCF. No solids separator of any kind was used in these tests. Therefore, further reduction of these emissions is feasible. A baseline run with straight pulverized coal shows sulfur dioxide emissions that are two orders of magnitude and particulate emissions that are an order of magnitude higher than the corresponding pulverized pellet fuel emissions. The coal test showed an unburned carbon in the flyash amount of 20 to 30 times the corresponding value for pulverized pellet. A distinct amount of visible smoke was present in the stack gas when burning coal versus absolutely no visible smoke when burning the pulverized pellet.

A mixture of 50% pulverized coal and 50% pulverized pellet was burned successfully without any handling, feeding, or combustion problems. Essentially complete burnout was obtained, and there was a considerable reduction in the amount of visible smoke relative to the straight coal run. The $NO_x$, ash, and $SO_2$ emissions were considerably reduced relative to coal and were in between those for pure pulverized pellet and straight coal. Ash fusion temperatures for the pulverized fuel pellet were higher than for just coal. The pulverized fuel pellet is, therefore, less likely to slag.

EXAMPLE II

Seven tests were conducted to establish the compatibility of burning fuel oil and pulverized pellets simultaneously and to compare the performance of No. 6 fuel oil versus pulverized pellets. A special burner was used that injects a spray of fuel oil within an annulus of injected pulverized pellets. The pellets were comminuted through a 1/16 inch screen.

The test results are given in Table II. Test No. 1 was a baseline test on 100% fuel oil. The test boiler had a capacity of 60,000 lb/hr of steam and was operated at 75% of capacity, or at approximately 45,000 lb/hr of steam, and at 150 p.s.i.g. The percentage of pellet was then increased gradually until 85% pellet/15% No. 6 fuel oil. (Tests 2 and 3).

The air-fuel control was manually operated to yield a clear stack exhaust appearance indicating complete combustion. Tests were made for atmospheric emissions evaluation.

The percentage solid fuel was then reduced to 60% for tests 4 and 5.

The unit was then switched back to all oil operation for tests 6 and 7 at the same percentage free oxygen in the stack gas as with the solid fuel. Some unexpected phenomena were observed under these conditions. The fuel oil flame inside the furnace became much longer; the stack gases shows some opacity due to soot formation; and the exhaust gas temperature increased over a hundred degrees Fahrenheit.

The excess air was then increased just sufficiently to eliminate the opacity of the stack gas, and two more fuel oil-only tests were conducted under these new conditions. The flame length was still longer than normal, and the stack gas temperature was still over a hundred degrees above normal.

The particulate emission test results are shown in Table II, together with other test data. The excess air requirement for pulverized solid fuel pellets was lower than for No. 6 fuel oil under the same conditions. (Compare tests 2 and 3 with tests 6 and 7.) This phenomena shows that the combustion rate of pulverized fuel pellets is faster than the combustion rate of No. 6 fuel oil. Thus, a normal oil-based firebox is sufficiently large to burn the pellets without modification. Under low excess air conditions, the stack gas temperature for pulverized fuel pellets was over a hundred degrees lower than for the No. 6 fuel oil. (Compare tests 2 and 3 with tests 6 and 7.) This phenomenon indicates the potential for a slightly higher boiler efficiency by using the solid fuel in place of the No. 6 fuel oil.

TABLE II

| Test<br>No. | Solid<br>Fuel | $O_2$ % | $CO_2$ % | Stack °F. | Particulate Emissions | |
|---|---|---|---|---|---|---|
| | | | | | grains/SCF<br>at 12% $CO_2$ | lb/hr |
| 1 | 0 | 9.5 | 8.1 | 399 | 0.124 | 7.0 |
| 2 | 85 | 2.3 | 13.1 | 358 | 0.189 | 13.2 |
| 3 | 85 | 2.3 | 13.6 | 343 | 0.142 | 10.7 |
| 4 | 60 | 2.0 | 14.1 | 363 | 0.141 | 11.0 |
| 5 | 60 | 1.7 | 14.2 | 356 | 0.167 | 13.1 |
| 6 | 0 | 2.6 | 12.2 | 487 | 0.076 | 8.1 |
| 7 | 0 | 2.6 | 12.4 | 464 | 0.109 | 11.2 |

What is claimed is:

1. A fuel pellet comprising from about 97 to about 99 percent by weight particulate naturally combustible material, and from about 1 to about 3 percent by weight particulate, synthetic polymeric thermoplastic material, the naturally combustible material comprising at least 50 percent natural cellulosic material with any balance being a filler, the synthetic thermoplastic material being distributed as discrete particles throughout the interior of the fuel pellet, solid at room temperature, between substantially minus 30 U.S. standard mesh and substantially plus 80 U.S. standard mesh, and having an injection molding temperature of at least about 95° C., the cellulosic material having a free moisture content of from about 5 to 15 percent by weight, and being between substantially minus 10 U.S. standard mesh and substantially 40 U.S. standard mesh, the plastic binding the cellulosic material together with a mechanical bond by bridging between cellulosic particles and anchoring to the particles, any filler being at least minus 10 U.S. standard mesh.

2. The fuel pellet of claim 1 wherein the thermoplastic material is selected from the group consisting of polystyrene, polyethylene, polypropylene, acrylonitrile-butadiene-styrene, acetal copolymer, acetal homopolymer, acrylic, polybutylene, and combinations thereof.

3. The fuel pellet claimed in claim 1 including a sheath of the thermoplastic material on the lateral surface of the pellet.

4. The fuel pellet claimed in claim 1 including up to about one percent by weight of an alkali silicate selected from the class consisting of sodium silicate and potassium silicate.

5. The fuel pellet claimed in claim 1 wherein the filler comprises bark.

6. The fuel pellet claimed in claim 1 wherein the filler comprises up to about 50 percent new bark.

7. The fuel pellet claimed in claim 1 wherein the filler comprises up to about 30 percent old bark.

8. The fuel pellet claimed in claim 1 wherein the filler comprises up to about 30 percent of one or more members of the class consisting of stillage, and byproducts of ethanol distillation processes, coal, and bark.

9. The fuel pellet claimed in claim 1 wherein the free moisture content of the cellulosic material is from about 10 to about 13 percent by weight.

10. The fuel pellet claimed in claim 1 wherein the free moisture content of the cellulosic material is from about 10.5 to about 11.5 percent.

11. The fuel pellet claimed in claim 1 wherein the pellet is an extrudate.

12. The feul pellet claimed in claim 1 wherein the pellet is an briquette.

13. The fuel pellet claimed in claim 9 wherein the thermoplastic material is selected from the group consisting of polystyrene, polyethylene, polypropylene, acrylonitrile-butadiene-sytrene, acetal copolymer acetal homopolymer, acrylic, polybutylene, and combinations thereof.

14. A method for preparing a fuel pellet from particulate naturally occurring combustible material and particulate synthetic polymeric thermoplastic material comprising the steps of:

(a) providing particulate naturally occurring combustible material including as a constituent at least natural cellulosic material having a free moisture content of from about 5 to about 15 percent by weight, and being between minus 10 U.S. standard mesh and plus 40 U.S. standard mesh and a filler of up to 50% by weight of a particulate material that is at least minus 10 U.S. standard mesh;

(b) providing particulate synthetic polymeric thermoplastic material that is solid at room temperature, has an ejection molding temperature of at least about 95° C., and being between substantially minus 30 U.S. standard mesh and plus 80 U.S. standard mesh;

(c) preparing a homogeneous feed comprising from about 97 to about 99 percent by weight of the particulate naturally occurring combustible material and from about 1 to about 3 percent by weight of the particulate thermoplastic material; and (d) compressing the feed at a pressure and a temperature whereby substantially all the thermoplastic material within the pellet remains particulate and unmelted but softens and bridges between cellulosic particles and anchors within the fibers of the cellulosic particles.

15. The method claimed in claim 14 wherein the compression step is by extrusion.

16. The method of claim 15 including the step of forming a substantially hydrophobic sheath of the thermoplastic on the pellet during the extrusion.

17. The method of claim 15 wherein the free moisture content of the cellulosic material before extrusion is from about 10 to about 13 percent.

18. The method of claim 14 wherein the naturally occurring combustible material comprises essentially the natural cellulosic material.

19. The method of claim 18 in which particulate thermoplastic material is selected from the group consisting of polystyrene, polyethylene, polypropylene, acrylonitrile-butadiene-styrene, acetal copolymer, acetal homopolymer, acrylic, polybutylene, and combinations thereof.

20. The method of claim 14 including the steps of drying naturally occurring material by combining it with an amount of calcium carbonate equal to about 2 to about 10 percent by weight of the naturally occurring material and then removing the calcium carbonate before the compression step.

21. The method claimed in claim 14 including the steps of softening the cellulosic material by adding between about 1 to about 10 percent by weight of an alkali silicate selected from one or more members of the class consisting of sodium silicate and potassium silicate before the compression step, and strenthening the pellet with such silicate by drying.

22. The method of claim 16 in which the particulate cellulosic material includes oil seeds, products of oil seeds, or both, for lubrication of the die.

23. The method claimed in claim 14 wherein the filler is selected from one or more members of the class consisting of coal, bark, stillage, and byproducts of ethanol distillation processes, and is present in no more than about 30 percent by weight.

24. The method claimed in claim 14 wherein the filler is new bark.

25. A fuel pellet comprising from about 87 to about 98 percent by weight particulate naturally combustible material, from about 1 to about 3 percent by weight particulate, synthetic polymeric thermoplastic material, and from about 1 to about 10% by weight of an alkali silicate selected from the class consisting of sodium silicate and potassium silicate, the naturally combustible material comprising at least 50 percent natural cellulosic material with any balance being a filler, the synthetic thermoplastic material being distributed as discrete particles throughout the interior of the fuel pellet, solid at room temperature, and having an injection molding temperature of at least about 95° C., the cellulosic material having a free moisture content of from about 5 to 15 percent by weight, the plastic binding the cellulosic material together with a mechanical bond by bridging between cellulosic particles and anchoring to the particles.

26. The fuel pellet claimed in claim 25 wherein the alkali silicate is present in from about 1 to about 2% by weight.

27. The fuel pellet claimed in claim 26 wherein the synthetic thermoplastic material is between substantially 30 U.S. standard mesh and substantially plus 80 U.S. standard mesh, the cellulosic material being between substantially minus 10 U.S. standard mesh and 40 U.S. standard mesh, and any filler being at least minus 10 U.S. standard mesh.

* * * * *